Aug. 10, 1937. L. S. BRACH Re. 20,465

LIGHTNING ARRESTER

Original Filed Sept. 21, 1932

INVENTOR
LEON S. BRACH
BY
A. D. T. Libby
ATTORNEY

Reissued Aug. 10, 1937 Re. 20,465

UNITED STATES PATENT OFFICE 20,465

LIGHTNING ARRESTER

Leon S. Brach, East Orange, N. J.

Original No. 1,947,967, dated February 20, 1934, Serial No. 634,127, September 21, 1932. Application for reissue February 15, 1935, Serial No. 6,717

23 Claims. (Cl. 175—30)

This invention relates to the design of a lightning arrester especially adapted for use in connection with arresters used by telephone and telegraph companies.

Lightning arresters used by said companies are usually made up of an assembly of springs arranged in banks in multiples of 20, the line wires being attached to certain of said springs which are separated from the ground plate or springs by small carbon blocks having thin strips of mica therebetween. Porcelain blocks have also been used with carbon inserts, the carbons being spaced apart by their manner of arrangement in the porcelains, and in some cases combinations of porcelain and carbon have been used, as well as other types of blocks. As lightning discharges pass across these carbon gaps, small particles of carbon are broken off and after a time, the gap is closed so as to ground the telephone or telegraph lines and to temporarily put them out of commission until a repair man takes the carbons out and cleans off the disintegrated particles of carbon sometimes combined with dust and dirt.

In certain types of arresters, particularly those used at station instruments, open air gaps between metal strips have been used singly and in combination with the blocks as above described.

My present invention is directed to a type of arrester to fit said spring-type of mountings, but I use in the arrester combination a sealed-in spark gap which has a lower breakdown voltage and a more efficient operating gap than the types of spark gaps used in prior art arresters to which reference has been made.

It is a general object of my invention to provide an arrester especially adapted for use in connection with telephone and telegraph lines, whether interior or in the distribution boxes on the poles, or elsewhere, which is more efficient and not likely to get out of order as has been described with respect to prior art arresters.

My improvement in this type of arrester will be readily understood by reference to the annexed drawing, wherein.

Figure 1:
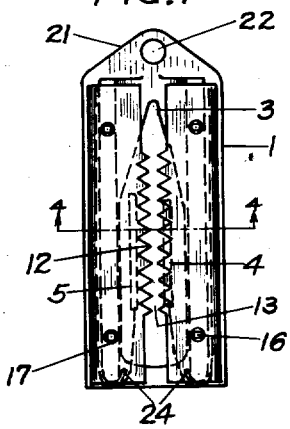
Figure 1 is a plan view of my arrester on an enlarged scale approximately twice normal size.
Figure 2:
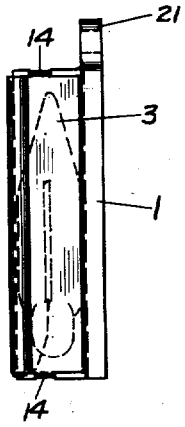
Figure 2 is a side elevation of Figure 1.

In the various views, 1 is an insulator of any suitable material, such as porcelain, which has a longitudinal groove 2 therethrough to receive a small bulb 3, preferably of glass, within which are mounted a pair of spaced electrodes 4 and 5. The bulb 3 is evacuated and filled with an inert gas such as neon, thus giving a sealed-in air gap having a very definite and positive breakdown voltage, the space between the electrodes 4 and 5 being arranged to suit the requirements of this type of arrester.

The sides 6 and 7 of the insulator are formed to receive spring-contact plates 8 and 9, the edges 10 and 11 of which are bent over the top of the insulator 1. The adjacent edges of the bent-over portions 10 and 11 are provided with serrations 12 to form a plurality of open gaps 13 between the bent-over edges 10 and 11. Certain of these serrations may be used for holding the bulb 3 in position within the recess 2. The gaps 13 preferably operate at a much higher voltage than the sealed-in gap 20, and thus act as an additional safety factor for the arrester.

Figure 3:
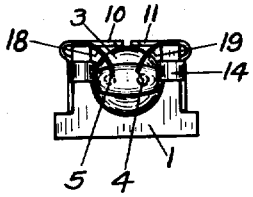
Figure 3 is an end view of the bottom of Figure 1.
Figure 4:
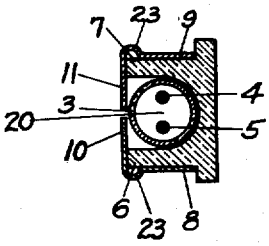
Figure 4 is a section on the line 4—4 of Figure 1.

Preferably, the plates 8 and 9 are provided with fingers 14 at both ends, and these fingers are bent over the ends of the insulator 1 as clearly shown in Figure 3. If desired, the insulator 1 may be provided with channels 15 to receive the edges of the plates 8 and 9 to more securely hold the same in position on the insulator. Also, if desired, the insulator 1 may be provided with projections 16 to enter holes 17 in the turned-over edges 10 and 11 to further assist in anchoring the plates 8 and 9 on the insulator. The terminals for the electrodes 4 and 5 are connected to their respective plates 8 and 9, or their bent-over edges 10 and 11, by wires 18 and 19. Thus the sealed-in gap 20 between the electrodes 4 and 5 is connected in parallel with the plurality of open air gaps 13.

If desired, the insulator 1 may be provided with an extension 21 having an orifice 22 therein for the purpose of inserting a tool to withdraw the arrester from its spring-mounting, it being understood that the springs engage the plates 8 and 9, the arrester being held and guided in position on the spring by the outwardly projecting parts 23 located between the respective plates and their bent-over portions 10 and 11. Preferably, the lower ends of the insulator and plates are rounded at 24 so as to assist in inserting the arrester between the mounting springs.

Figure 5:
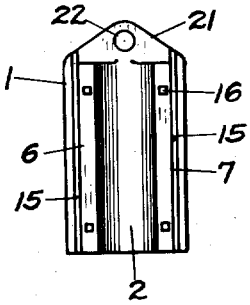
Figure 5 is a plan view of a modified form of the arrester shown in Figure 1.
Figure 6:
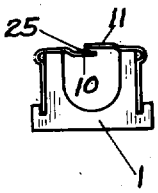
Figure 6 is a bottom end view of Figure 5.
Figure 7:
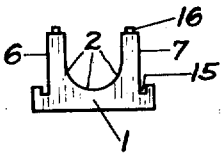
Figure 7 is a view of a modified form of insulator which may be used with either one of the forms of arresters shown.

In the form of arrester shown in Figures 5 and 6, the two bent-over portions 10 and 11 of the plates 8 and 9 may extend in overlapping relationship, forming a gap 25, and if desired, a mica insulator may be positioned within the gap 25 to prevent the parts 10 and 11 from being accidentally pushed into contact, one with the other. In some cases the open gap arrester shown in Figures 1 and 5 may be used without the tube 3 carrying the sealed-in gap, while on the other hand, the sealed gap tube 3 may be used alone, without the external auxiliary air gap, but in most cases I prefer to use the full combination.

In the arrester as described, the outer end of the arrester, when installed, is open, disclosing to view the bulb which is useful for test purposes, as a voltage may be applied to the line which will cause the bulb to become illuminated thereby indicating if the line is complete and that the arrester is also in working order.

It will be noted from the construction shown and described in Figures 1 to 7 inclusive, that one entire side of the arrester is of insulating material which is presented to an adjacent set of edges 10 and 11 as these arresters are mounted in the spring holders. This prevents short-circuiting the lines as the arresters are installed, or shorting the lines by accidental dropping of solder, small tools, or pieces of wire, between the arresters, and also prevents heavy discharges from jumping from one block to another.

Figure 8:
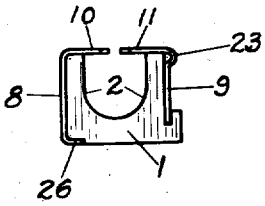
Figure 8 shows a form of insulator and contact plates for use in an arrester having a common ground plate for engaging one of the contact plates of all of the arresters.

In the form of arrester shown in Figure 8, the contact plate 8 is bent over at 26, preferably fitting a recess in the insulator 1 so as to be flush with the side thereof. In this type of arrester, the contact plate 8 is adapted to make sliding engagement with a common ground plate which is sometimes used in certain forms of arresters. This form can also be used with the double spring contact type of arrester, as the shoulder 23 on the contact plate 9 will hold the arrester in position between the springs. Even in this form of arrester, the side on which the bent-over portion 26 is positioned, presents substantially the same advantages as previously pointed out for the other forms of arresters.

From what has been said, it will be seen that I have thus combined in one small, compact structure, an arrester having a plurality of gaps, an open gap and a sealed-in gap, all of which I believe to be new for an arrester of this type.

Having thus described my invention, what I claim is:

1. A lightning arrester for the purpose described, including an insulator having a longitudinal groove therein, contact plates mounted on opposite sides of said insulator and having portions bent over said groove to form an air spark gap therebetween, a sealed tube, positioned within said groove, having a pair of spaced sealed-in electrodes and having said electrodes electrically connected to said contact plates.

2. A lightning arrester for the purpose described, including an insulator having a longitudinal groove therein, contact plates mounted on opposite sides of said insulator and having portions bent over said groove, the edges of said bent-over portions having a plurality of oppositely arranged serrations forming air spark gaps, a sealed tube filled with an inert gas positioned within the groove, a pair of spaced electrodes within the tube, and means electrically connecting said electrodes to said contact plates.

3. A lightning arrester for the purpose described, including an insulator having a longitudinal groove therein, contact plates mounted on opposite sides of said insulator and having portions bent over said groove to form an air spark gap therebetween, said plates having outwardly projecting parts at places where said portions are bent for the purposes described, a sealed tube, positioned within said groove, having a pair of spaced sealed-in electrodes and having said electrodes electrically connected to said contact plates.

4. A lightning arrester for the purpose described, including an insulator having a longitudinal groove therein, contact plates for engaging mounting springs mounted on opposite sides of said insulator and having portions bent over said groove to form an air spark gap therebetween, means located on said plates for guiding the arrester onto its mounting springs, an inert-gas-filled tube, positioned within said groove, having a pair of spaced sealed-in electrodes and having said electrodes electrically connected to said contact plates.

5. A lightning arrester for the purpose described, including an insulator having a longitudinal groove therein, contact plates mounted on opposite sides of said insulator and having portions bent over said groove to form an air spark gap therebetween, an inert-gas-filled tube positioned within said groove, parts of said bent-over plate portions assisting in holding the tube within the groove, said tube having a pair of spaced sealed-in electrodes and having said electrodes electrically connected to said contact plates.

6. A lightning arrester for the purpose described, including an insulator having a longitudinal groove therein, contact plates mounted on opposite sides of said insulator and extending parallel with the groove, and having fingers bent over the ends of the insulator, portions of said plates extending over one side of the insulator and forming a plurality of open air spark gaps over the groove, an inert-gas-filled tube, positioned within said groove, having a pair of spaced sealed-in electrodes and having said electrodes electrically connected to said contact plates.

7. A lightning arrester for the purpose described, including an insulator having a longitudinal groove therein, contact plates mounted on opposite sides of said insulator and extending parallel with the groove, and having fingers bent over the ends of the insulator, said insulator having channels on opposite sides to receive the edges of said plates, portions of said plates extending over one side of the insulator and forming a plurality of open air spark gaps over the groove, an inert-gas-filled tube, positioned within said groove, having a pair of spaced sealed-in electrodes and having said electrodes electrically connected to said contact plates.

8. A lightning arrester for the purpose described, including an insulator having a longitudinal groove therein, contact plates mounted on opposite sides of said insulator and extending parallel with the groove, means on the insulator cooperating with means on said plates for securely holding said plates on the insulator, and further means on the insulator for use in withdrawing the arrester from its spring-mounting, portions of said plates extending over one side of the insulator and forming a plurality of open air spark gaps over the groove, an inert-gas-filled tube, positioned within said groove, having a pair of spaced sealed-in electrodes and having said electrodes electrically connected to said contact plates.

9. A lightning arrester including, an insulator, a sealed tube having a pair of spaced electrodes therein, the tube preferably being filled with an inert gas, said tube being carried by the insulator, a pair of metallic plates securely mounted on the insulator and extending along the same in a direction parallel to said tube, said plates having portions forming along one side of the insulator a plurality of open air spark gaps, said tube electrodes being electrically connected to said plates.

10. A lightning arrester for the purpose described, including an insulator, a sealed tube carried by the insulator and having a pair of spaced electrodes therewithin, said tube being filled with an inert gas, preferably neon, contact plates securely mounted on said insulator and electrically connected, one each, to said tube electrodes, portions of said contact plates extending over the insulator to form at least one open air spark gap in multiple with the sealed-in gap between said spaced electrodes, and means on the insulator for use in withdrawing the arrester from its mounting.

11. A lightning arrester including a pair of contact plates extending substantially the full length of the arrester, insulating means also extending substantially the full length of the arrester and carrying said contact plates in spaced relation, a hermetically sealed tube having a pair of spaced electrodes therein forming a spark gap, the tube being filled with an inert gas, said tube being positioned between and extending in the same direction as said spaced plates, and having its electrodes connected across said plates.

12. A lightning arrester as set forth in claim 11, characterized in that at least one pair of edges of said plates are bent over toward each other to form at least one open air spark gap.

13. A lightning arrester for the purpose described, including insulating means having a space between parts thereof, contact plates mounted on opposite parts of said insulating means and extending parallel with said space, means on the insulating means cooperating with said plates for securely holding said plates on said insulating means, portions of at least one of said plates extending over at least one side of said insulating means and forming, with the other plate, a plurality of open air spark gaps, an inert gas-filled tube positioned within said space and having a pair of spaced sealed-in electrodes and having said electrodes electrically connected to said contact plates.

14. A lightning arrester for the purpose described including, insulating means, a sealed tube nearly the same length as said insulating means and carried thereby, contact plates extending along opposite sides of said insulating means parallel to the tube, and at least one having a bent-over portion extending over one side of the tube to form an open air spark gap with the other plate, said tube having a pair of spaced electrodes connected, one each to said plates, and preferably filled with an inert gas such as neon.

15. A lightning arrester for mounting between at least one spring and a cooperating member, including insulating means carrying substantially parallel mounted laterally spaced contact plates, and also carrying a tube laterally spaced between parts of said insulating means and between and parallel to said contact plates, said tube being sealed and enclosing a pair of spaced electrodes electrically connected, one each to said contact plates, said contact plates having portions forming a spark gap in multiple to said electrodes, said tube being capable of transmitting light therethrough and containing a gas such that the gap between the electrodes may be tested by application of a suitable voltage to the contact plates, whereby the tube is caused to give out a glow.

16. A lightning arrester for the purposes described including, a pair of metallic plates each having flat contact surfaces extending substantially the length of the arrester, insulating means holding said plates so the contact surfaces are in parallel relationship, a sealed tube having a pair of spaced electrodes therein forming a spark gap and positioned between and parallel to said plates and parts of said insulating means, the electrodes within said tube being electrically connected to said contact plates, said plates having parts forming an air spark gap in multiple with the sealed-in spark gap.

17. A lightning arrester for mounting in slidable endwise relationship between at least one spring and a cooperating member, including a sealed tube having internal electrodes forming a spark gap therewithin, two contact plates running lengthwise of the arrester and connected one each to said spark gap electrodes, at least one of the plates being so formed as to guide and positively position the spring centrally therein and thereby prevent side movement of the arrester.

18. A lightning arrester including a sealed tube having interiorly spaced electrodes forming a spark gap, a substantially complete housing for said tube comprising insulating means and a pair of plates extending longitudinally of the arrester supported entirely by said insulating means, said plates being electrically connected one each to said tube electrodes and arranged for mounting the arrester in slidable endwise relationship, and means on at least one of said plates to positively position said arrester in its mounting.

19. A lightning arrester including a sealed tube having interiorly spaced electrodes forming a spark gap, a substantially complete housing for said tube comprising insulating means and a pair of plates extending longitudinally of the arrester supported entirely by said insulating means, said plates being electrically connected one each to said tube electrodes and arranged for mounting the arrester in slidable endwise relationship, a part of said insulating means extending at least at one end beyond said plates.

20. A lightning arrester for mounting between at least one spring and a cooperating member including a pair of contact plates extending substantially the full length of the arrester, insulating means supporting said contact plates in spaced relation, an hermetically sealed tube having a pair of spaced electrodes therein forming a spark gap, said tube being positioned between and extending in the same direction as said spaced plates and having its electrodes connected across said plates, said insulating means being located with respect to said spaced plates so as to act to prevent shorting adjacent lines with which the arrester may be used.

21. A lightning arrester as defined in claim 20, further characterized in that said spaced plates have parts forming an air spark gap in multiple with the sealed-in spark gap.

22. A lightning arrester for mounting between at least one spring and a cooperating member including a pair of contact plates extending substantially the full length of the arrester, insulating means supporting said contact plates in spaced relation, an hermetically sealed tube having a pair of spaced electrodes therein forming a spark gap, said tube being positioned between and extending in the same direction as said spaced plates and having its electrodes connected across said plates, said insulating means extending at least at one end of the arrester a short distance beyond the body portion thereof.

23. A lightning arrester as defined in claim 22, further characterized in that said spaced plates have parts forming an air spark gap in multiple with the sealed-in gap.

LEON S. BRACH.